United States Patent

[11] 3,580,546

[72] Inventors Colin Kenneth Glenn Fraser;
Ernest Favreau; Willis Paul March,
Vancouver, British Columbia, Canada
[21] Appl. No. 854,888
[22] Filed Sept. 3, 1969
[45] Patented May 25, 1971
[73] Assignee Kaydon Technical Enterprises, Ltd.
Vancouver, Canada
[32] Priority Sept. 5, 1968
[33] Canada
[31] 029,275

[54] DEVICE FOR MIXING AND PROPORTIONING LIQUIDS
23 Claims, 8 Drawing Figs.
[52] U.S. Cl. ................................................. 259/4,
222/139, 222/318, 222/367, 259/18, 415/6
[51] Int. Cl. .................................................... B01f 15/04,
G05d 11/02
[50] Field of Search .......................................... 259/4, 18;
222/367, 318, 138, 139; 415/6

[56] References Cited
UNITED STATES PATENTS
| 1,190,721 | 7/1916 | Campbell | 415/6X |
| 1,372,768 | 3/1921 | Mott | 222/367X |

Primary Examiner—William T. Price
Attorney—Cushman, Darby and Cushman

ABSTRACT: An apparatus for mixing and proportioning liquids includes a plurality of tanks for containing liquids to be mixed together. Each of the tanks has a bucket carrying assembly disposed therein, each such assembly being arranged for rotation to cause the buckets to successively enter into and emerge from the liquid contained in their respectively associated tank. The buckets are provided with means whereby each bucket is completely filled during each rotation cycle of each assembly. The buckets are also provided with means to effect discharge of the content of the buckets at a discharge region and a mixing device is provided to receive the discharged liquids and mix them together. The liquid capacities for buckets of each assembly are preselected to permit the several liquids to be mixed together in the desired proportions.

Patented May 25, 1971

COLIN KENNETH GLENN FRASER
ERNEST FAVREAU
WILLIS PAUL MARCH

BY: Cushman, Darby & Cushman
attorneys

Patented May 25, 1971

Colin Kenneth Glenn Fraser
Ernest Favreau
Willis Paul March

By: Cushman, Darby & Cushman
Attorneys

Patented May 25, 1971

COLIN KENNETH GLENN FRASER

ERNEST FAVREAU

WILLIS PAUL MARCH

By Cushman, Darby & Cushman
attorneys

Patented May 25, 1971  3,580,546

Colin Kenneth Glenn Fraser
Ernest Favreau
Willis Paul March
By: Cushman, Darby & Cushman
    Attorneys

DEVICE FOR MIXING AND PROPORTIONING LIQUIDS

This invention relates to a device for mixing liquids together and accurately proportioning said liquids relative to one another thereby to provide a well mixed solution of predetermined concentration.

While the principles of the present invention are applicable to many different situations wherein a chemical solution of predetermined strength is required, the present invention is particularly well suited for use in central supply units for servicing artificial kidneys.

A major problem in servicing artificial kidney units has been the requirement for a constant supply of dialysate, a salt and water solution, at a constant predetermined concentration. If the required concentration, i.e. 34 parts water to one part chemical concentrate, is not maintained, serious damage, or even the death of the patient can result. The present invention substantially eliminates the difficulties inherent in the earlier forms of dialysate supply units and greatly facilitates the provision of a continuous supply of dialysate at an exact, predetermined concentration.

The present invention, accordingly, provides an apparatus for mixing and proportioning liquids. The apparatus includes a plurality of tanks adapted to contain the liquids to be mixed together. Each of the tanks has an assembly at least partially disposed therein and carrying a plurality of buckets having predetermined capacities chosen in accordance with the required liquid proportions. These assemblies are constructed such that when the assemblies are driven, the buckets successively enter into and emerge from the liquids contained in their respectively associated tanks. The buckets are provided with means to permit them to completely fill while they are in the liquids and to completely discharge after their emergence therefrom. The discharging liquids are directed into a mixing device arranged to thoroughly mix the several liquids together. The liquid capacities of the buckets of each assembly are selected relative to the liquid capacities of the buckets of each other assembly to provide the desired proportioning of the liquids to be mixed. In the example to be described hereinafter, two bucket carrying assemblies are provided, with the volume of each bucket of a first one of the assemblies being a predetermined fraction of the volume of each bucket of the second assembly. In the case of dialysate preparation, the volume ratio between the two sets of buckets is 34:1.

The present invention includes many other important features, full descriptions of which are given below. For definitions of the present invention reference should be had to the appended claims.

In the drawings which illustrate an embodiment of the invention:

Figure 1:
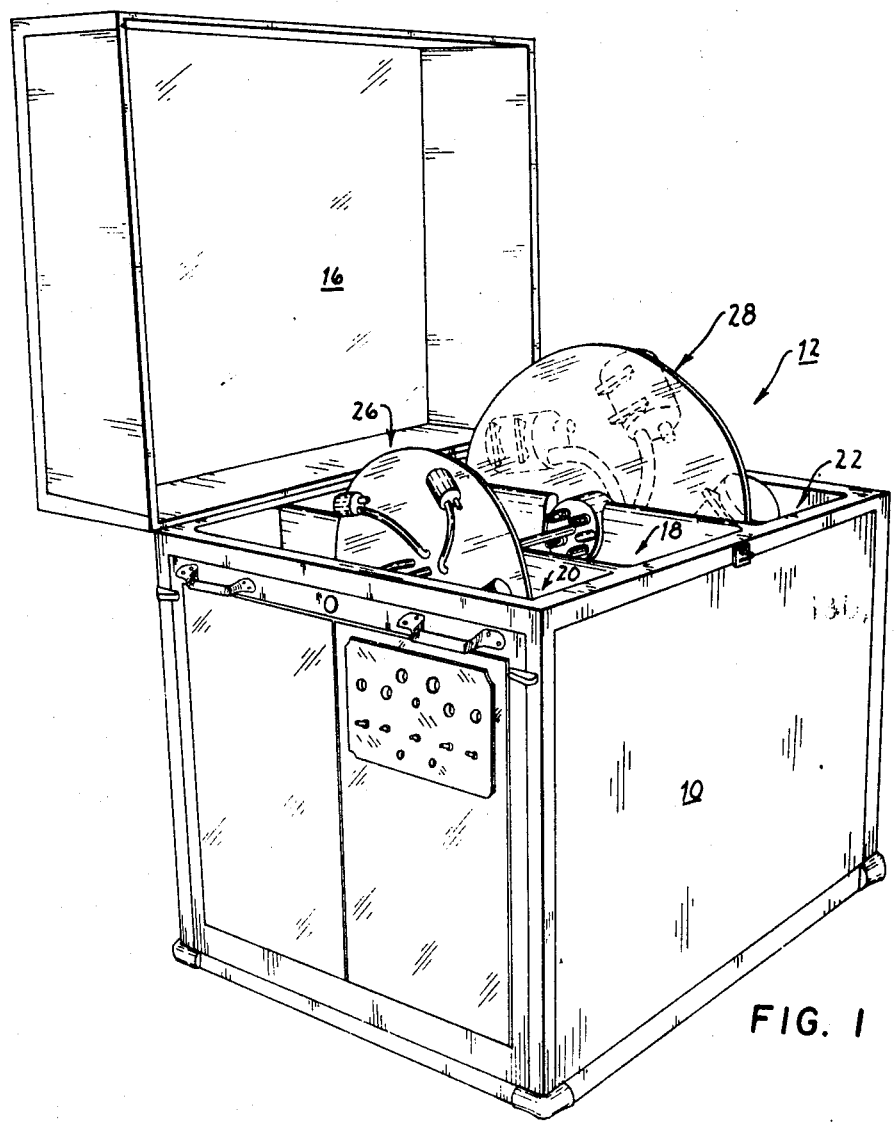
FIG. 1 is a perspective view illustrating the mixing and proportioning unit of the present invention mounted in a cabinet.

FIG. 1 shows the supply unit mounted in a cabinet 10 of size sufficient to accommodate the mixing and proportioning unit 12 as well as the many electrical controls, pumps, fluid supply inlets and outlets and the like normally associated with a device of this nature. Cabinet 10 includes a lid 14 hinged to the remainder of the cabinet. Lid 14 preferably is provided with a transparent top 16 to permit the mixing and proportioning unit to be observed without the need of swinging lid 14 upwardly, thus reducing the possibility of contamination of the liquids being mixed.

The mixing and proportioning unit 12 includes three separate tanks positioned in side-by-side relation. The center tank 18 is called the mixing tank while the remaining tanks 20 and 22 which flank the mixing tank 18 are referred to respectively as the concentrate tank and the water tank. As may be seen in FIG. 2 the concentrate tank 20 may be of somewhat smaller volume than the remaining two tanks.

Extending transversely of the three tanks 18, 20 and 22 at a level slightly below the level of the upper sidewall portions of the tanks is a shaft 24 mounted for rotation in suitable bearings (not shown). Secured to the shaft 24 in spaced apart relation are the bucket wheel assemblies referred to generally as 26 and 28. Bucket wheel assembly 26 is generally of smaller dimensions than the assembly 28 and is positioned so that its lower half is disposed in the concentrate tank 20, while the large bucket wheel assembly 28 is disposed with its lower half generally in water tank 22.

Figure 2:
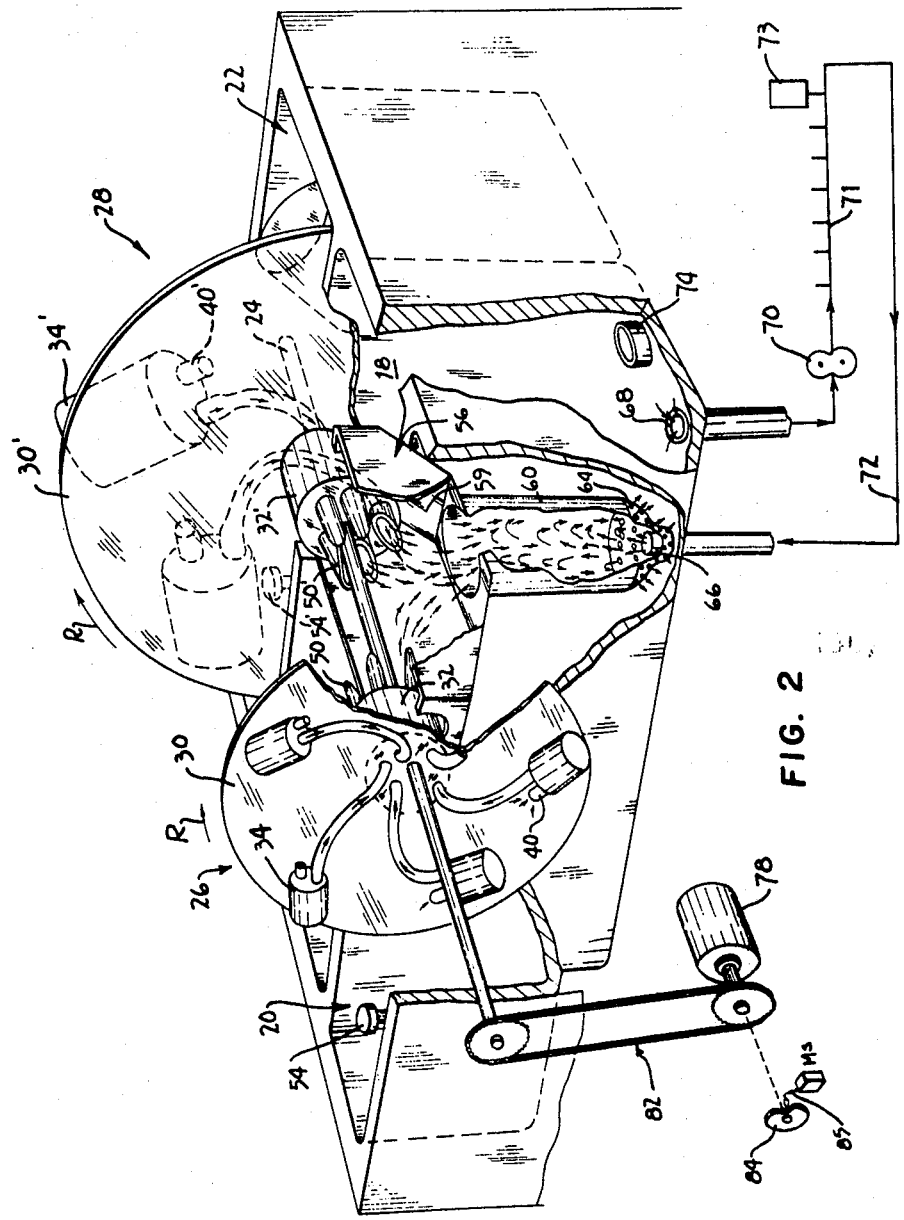
FIG. 2 is a perspective view of the mixing and proportioning unit with certain portions of the assembly being cut away to show the internal structure.

The several components of the bucket wheel assemblies may conveniently be made from a clear, transparent plastic, nontoxic and nonreactive with the liquids being handled. FIGS. 1 and 2, in particular, show the several components of these assemblies as they would appear when the transparent plastic material is used.

Figure 4:
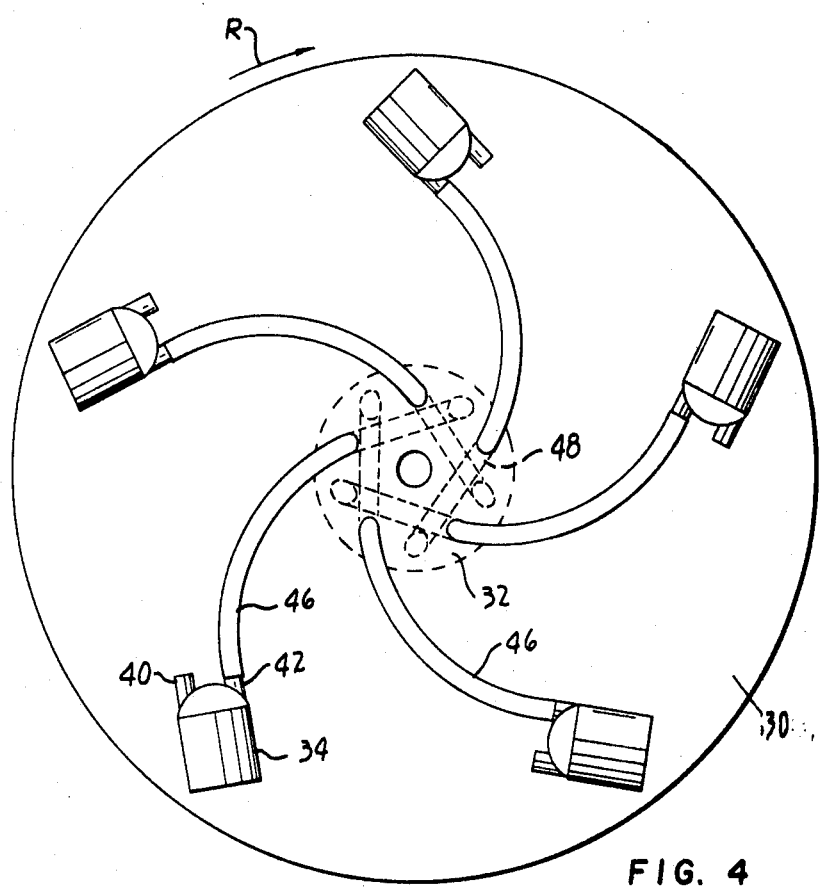
FIGS. 4 and 5 are plan and elevation views respectively of one of the bucket wheel assemblies.
Figure 5:
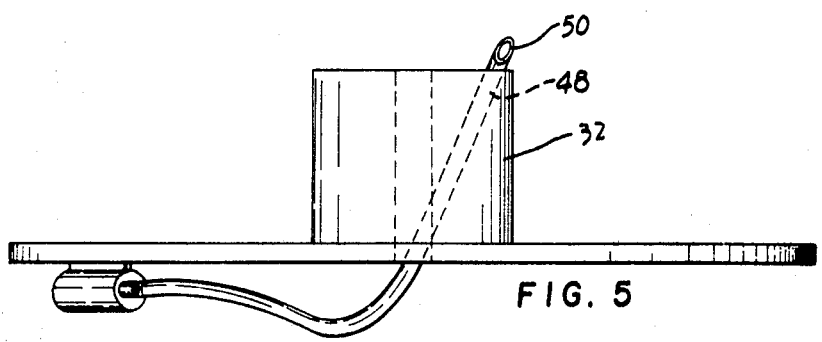

Since the two bucket wheel assemblies are of the same general construction, the bucket wheel assembly 26 only will be described in detail, particular reference being had to FIGS. 4 and 5. Bucket wheel 26 includes a generally circular disc 30 having a cylindrical hub 32 centrally secured thereto and projecting outwardly from one face of disc 30. Secured to the disc 30 on the face opposite the face to which hub 32 is secured are a plurality of concentrate buckets 34, in this case five in number. The buckets 34 are spaced apart a uniform angular amount, in this case 72°, and are disposed a uniform distance from the rotation axis of disc 30 defined by shaft 24.

Figure 6:
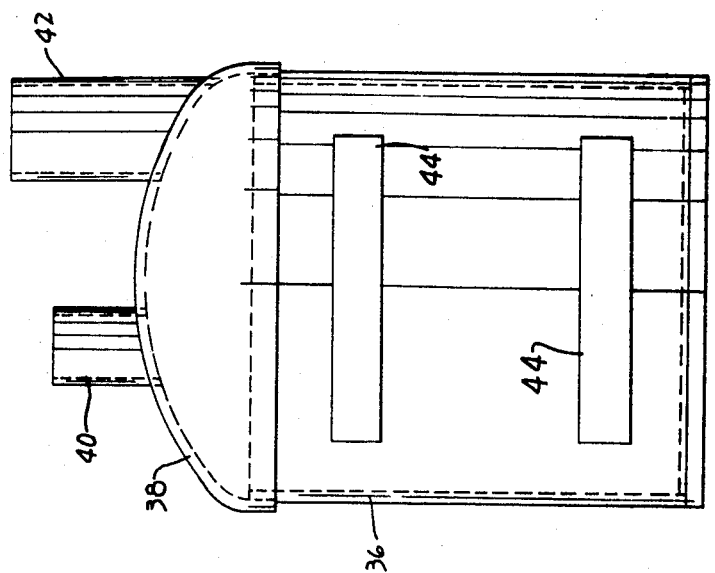
FIGS. 6 and 7 are elevation and plan views respectively of one of the buckets.
Figure 7:
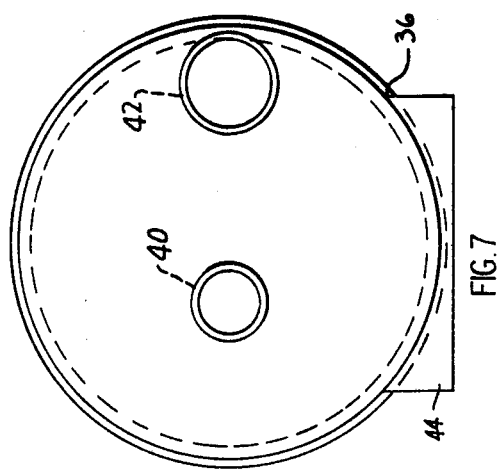

A typical bucket is illustrated in detail in FIGS. 6 and 7. Each bucket 34 includes a generally hollow body 36 of circular or other suitable cross section, closed at its base and preferably having a domed top 38. A fill spout 40 is positioned closely adjacent the highest point of the domed top to prevent air entrapment within bucket 34 during filling while a pour spout 42 is positioned well over towards the sidewall of the bucket body to permit the bucket 34 to empty completely through the pour spout as the bucket assumes an inverted position during rotation of the disc 30. Both the fill and pour spouts are parallel to the medial axis of the bucket body 36.

Buckets 34 are secured to the face of disc 30 via brackets 44 by suitable securing means and in such a fashion that the medial axis of each bucket is disposed at an angle to a radius of the disc 30 passing adjacent a central point of the bucket. In the case of the bucket wheel assembly 26 this angle is conveniently about 45° while with the somewhat larger bucket wheel assembly 28 the angle is about 55°. These angles may be varied considerably, but as will be seen hereinafter, the liquid levels which must be maintained in the tanks 20 and 22 must be varied accordingly if proper filling and levelling of buckets 34, 34 is to take place. It will be appreciated that such angle is measured in a plane parallel to the plane of disc 30 and that the pour and fill spouts 42 and 40 face generally in the direction of rotation of disc 30 indicated by the arrow R, with the fill ports 40 being located generally radially outwardly of the pour spouts 42 all as shown in FIG. 4.

The pour spout 42 of each bucket is connected to an elongated hose 46 which extends from the pour spout in a curved path directed both inwardly toward the rotation axis of disc 30 and angularly about the latter, in this case about 72°, in the direction of rotation of disc 30. Each hose 46 then passes through an associated passageway 48 which extends through the disc 30 and the hub 32, in such a manner that the exit end 50 of each hose 46 projects a short distance outwardly of the face 52 of the free outer end of hub 32. Each passageway 48 extends through hub 32 at an oblique angle with respect to the rotation axis of the latter whereby the hose 46 passing therethrough effectively passes still further around said rotation axis in the direction of rotation of the disc. By virtue of the path taken by each hose 46 from the pour spout of the bucket associated therewith through to its exit end 50, such exit end is displaced approximately 180° about the rotation axis of the assembly from the pour spout of the bucket in the direction of rotation of the bucket wheel assembly. This configuration, as will be seen later, facilitates pouring of the buckets 34 as the bucket wheel assembly rotates.

Bucket wheel assembly 28 is of the same general construction as bucket wheel assembly 26 and except for its dimensions is a mirror image of the latter. The two assemblies 26 and 28 are mounted with their respective hubs 32, 32' in spaced, confronting relation with the exit ends 50 of the pour hoses 46 of bucket wheel assembly 26 projecting generally towards the exit ends 50' of the pour hoses associated with bucket wheel assembly 28. As can be seen from FIGS. 1 and 2, the hubs 32, 32' and their associated hose exit ends 50 project a short distance inwardly of mixing tank 18 through cutouts in the opposing sidewalls of the latter. The buckets 34 of assembly 26 and the buckets 34' of assembly 28 occupy angular positions about shaft 24 which correspond with one another thereby ensuring that each bucket 34 discharges simultaneously with its corresponding bucket 34' on the opposing bucket wheel assembly.

The volume of each bucket 34 is carefully chosen relative to the volume of each bucket 34'. In the case of dialysate preparation, the buckets 34' which dip into water tank 22 each have a volume 34 times as great as the volume of each buckets 34 which handle the chemical concentrate. This provides, as will be seen later, a solution having 34 parts water to one part concentrate. Accurate and complete filling of each bucket is assured by virtue of the relatively small fill ports 40, 40' on the buckets, which permit accurate calibration of the volume of each bucket. In addition, the levels of the concentrate in tank 20 and the levels of the water in tank 22 are maintained between the optimum maximum and minimum values required to provide accurate bucket levelling. The level in concentrate tank 20 is maintained by float valve 54 which is connected to a supply of chemical concentrate at room temperature, while the level in water tank 22 is maintained by float valve 54', the latter being connected to a supply of sterile water heated to about 100° F. The optimum liquid levels to be maintained in the concentrate tank 20 and the water tank 22 are dependent somewhat upon the previously mentioned angles which the medial axes of the buckets 34, 34' make with radial lines on disc 30 passing adjacent central points of the buckets. The liquid level in each tank must be maintained at a level which will permit each bucket 34, 34' to occupy a true upright vertical position with at least the upper portion of the fill spout 40 above the liquid surface as each bucket emerges from the liquid during rotation of the bucket wheel assemblies in the direction given by the arrows R. If the liquid level is too high, the buckets will have taken an inclined position by the time their fill spouts clear the liquid surface and the bucket will not contain the amount for which it has been calibrated; if the liquid level is too low, the buckets will not have an opportunity to fill properly before they emerge from the liquid.

Figure 3:
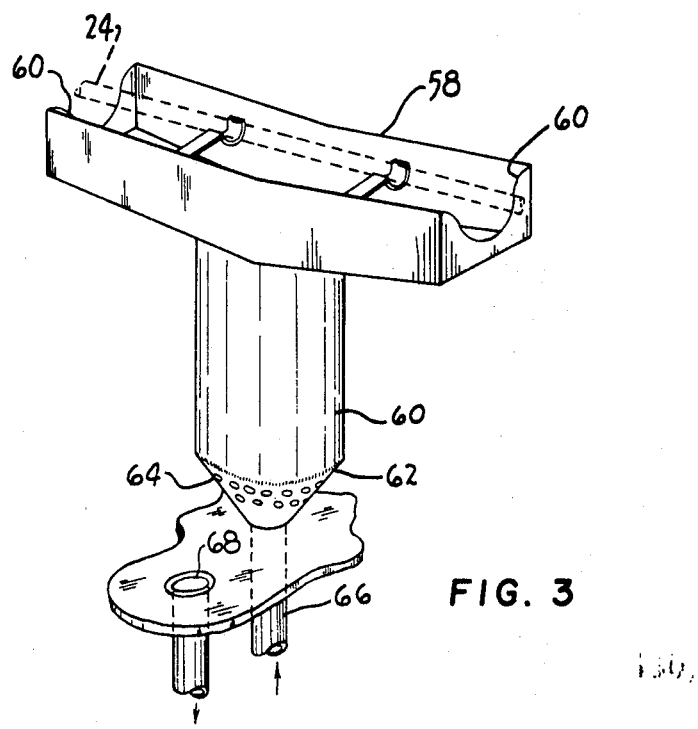
FIG. 3 is a perspective view illustrating the mixing trough and mixing hopper subassembly.

As mentioned previously, the bucket wheel assemblies 26, 28 are arranged such that their respective hubs 32, 32' face towards each other with the exit ends 50, 50' of pour hoses 46, 46' also projecting generally towards each other. In order to receive the contents of the buckets 34, 34' as they discharge their contents through pour hoses 46, 46', there is disposed within the mixing tank 18, a mixer generally designated 56 as seen in FIGS. 2 and 3. Mixer 56 includes an elongated trough 58 having its longitudinal axis disposed parallel to the axis of shaft 24 with opposing ends of trough 58 having cutout portions 60 which permit the hubs 32, 32' of the bucket wheel assemblies to extend a short distance over and into trough 58 from opposing ends of the latter. The bottom floor portions 59 of trough 58 slope downwardly towards the center of the latter and lead into and are secured to the open upper end of a hollow cylinder 60 which extends downwardly towards the floor of the mixing tank 18. Secured to the lower end of cylinder 60 is a generally conical portion 62 having a plurality of small openings 64 therein. The lowermost end of conical portion 62 has an opening therein through which the end portion of a return pipe 66 projects, the latter being aligned with the axis of cylinder 60.

The floor of mixing tank 18 has a mixture outlet 68 therein connected to the inlet of a positive displacement pump 70. The outlet of pump 70 is connected to a manifold 71 which in turn supplies a number of artificial kidney units, one of which is designated as 73, with the mixture from tank 18. Since the artificial kidney units use only a portion of the mixture supplied thereto from the manifold, there is a substantial return flow through manifold return 72, such return flow passing upwardly through return pipe 66 thereby to effect proper mixing of the fluids supplied from the bucket wheel assemblies 26 and 28 as will be more fully described hereinafter.

Figure 8:
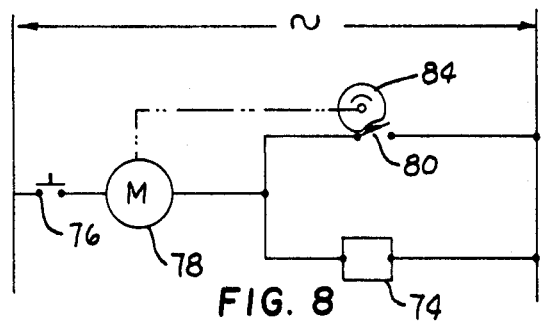
FIG. 8 is a schematic diagram of the electrical circuit for the bucket wheel drive.

The liquid level of the mixture within mixing tank 18 is held well below the edges of trough 58 of mixer 56 thus preventing liquid from the mixing tank 18 from entering the upper end of the mixer. This liquid level is controlled by means of a diaphragm switch 74 positioned on the floor of mixing tank 18. Diaphragm switch 74 is sensitive to the "head" of liquid in tank 18 and responds thereto to effect make and break of the circuit shown in FIG. 8. The circuit of FIG. 8 is connected across a supply source "S" and includes on-off switch 76, the windings of a gearmotor 78, and a limit switch 80 connected in parallel with diaphragm switch 74. The gearmotor 78 is connected by suitable chain and sprocket means 82 to effect rotation of shaft 24 and the bucket wheel assemblies 26, 28 at a slow, uniform rate of speed (in the present case about 2 r.p.m.). A cam 84 which rotates with gearmotor 78 controls the opening and closing of switch 80 and since the latter is connected in parallel with diaphragm switch 74 it will be appreciated that both switches must be "open" before the supply to the gearmotor 78 is cut off. In operation, once the liquid level in tank 18 exceeds the desired level, the diaphragm switch "opens"; however the gearmotor 78 continues to drive the bucket wheel assemblies 26 and 28 until the latter reach an angular position wherein one concentrate bucket 34 and one water bucket 34' have just finished discharging their contents, while the following two buckets have not yet started to discharge. At this point the follower lever 85 on switch 80 drops into a cutaway portion on the surface of the cam 84 thus cutting off the power to gearmotor 78. In this way there is never a partial discharge of either water or concentrate into the mixing tank with the result being that the concentration of the mixture remains constant. As the mixture is pumped out of tank 18 by pump 70, the level of tank 18 drops and the diaphragm switch "closes" thus supplying power to the gearmotor 78 to again drive the bucket wheel assemblies in rotation.

It will be realized that suitable heater means should be provided to maintain the temperature of the mixture in the tank 18 at a proper temperature. In the case of dialysate preparation, this temperature is maintained at 37° C. In addition, suitable controls must be provided to maintain the output pressure of pump 70 at the correct value. Other control and alarm systems for indicating under or over temperature conditions in any of tanks 18, 20 and 22, improper pump output pressures, or variations in the concentration of the mixture in tank 18 will be necessary when the device of the present invention is used as a dialysate supply unit. However, since such control and alarm systems do not comprise a part of the present invention they will not be further described here.

The operation of the device will now be described with particular reference being had to FIG. 2 of the drawings. As the bucket wheel assemblies 26 and 28 rotate in the direction given by the arrows R the buckets 34, 34' enter the fluids in the respective tanks 20 and 22 in an inverted position. Liquid enters the fill ports 40, 40' of the buckets with air being exhausted through the pouring ports 42, 42' and their associated pouring hoses 46, 46'. The buckets continue to fill as rotation continues and they are completely full prior to their emergence from the liquids in their associated tanks. As the buckets emerge, they are actually "over full" as liquid has filled a portion of their associated pouring hoses 46, 46'. At this point each emerging bucket is in a true vertical position allowing some of the liquid contained in the pouring ports 42, 42' and pour hoses 46, 46' to drain off outwardly through the fill ports 40, 40'. This action takes place during continuous rotation of the bucket wheel assemblies 26, 28' at the rate of 2 r.p.m. At this instant of time the liquid levels in each of the two emerging buckets are in exact correspondence with the uppermost extremities of the bucket fill ports 40, 40' with the result being that the buckets 34, 34' under consideration hold the exact amounts of liquid for which they have been calibrated.

As rotation of the bucket wheel assemblies continues, the contents of the two buckets under consideration discharge through their associated pour hoses into the mixer 56. By virtue of the previously mentioned configuration of the pour hoses, the discharging fluid is carried outwardly through the hubs 32, 32' and makes its exit from the exit ends 50 which project outwardly of the ends of the hubs. Due to the fact that each pour hose exit end 50 is displaced some 180° about the axis of rotation from the bucket with which it is associated, the hose exit end 50 through which fluid is discharging is at a lower elevation than the remaining exit ends 50 with the result being that fluid is discharged well down into the trough of the mixer 56 and, in addition, there is no chance that some fluid discharging from one exit end 50 will find its way back into an adjacent one of the exit ends 50 and thence work its way back into an associated bucket hence creating inaccuracies in the proportioning of the two liquids. It will, of course, be appreciated that during the above described sequence, the remaining buckets of the assemblies 26 and 28 are in various stages of filling, pouring, etc., and that the sequence described is repeated over and over as long as rotation of assemblies 26, 28 is continued.

The two liquids discharging from the bucket wheel assemblies pass into the trough 58 of mixer 56 and thence flow downwardly into the vertically disposed cylinder 60 where the two liquids encounter the return flow from manifold 71 passing upwardly through the return pipe 66. Due to the countercurrents and turbulence thus created within cylinder 60, the liquids flowing from the two bucket wheel assemblies are well mixed with the return fluid.

As the buckets continue to pour their contents into mixer 56, the liquid level in the latter tends to rise slightly above the liquid level in the mixing tank 18; however; this causes mixed fluid to escape through the apertures 64 in the conical section 62 at the lower end of mixer 56 thus maintaining the liquid heads, or levels, in the mixer 56 and in the mixer tank 18, substantially equal to one another. The passage of the liquid through the numerous small apertures 64, such liquid already having been thoroughly agitated within the cylinder portion 60 of mixer 56, completes the mixing process. The mixed liquids are pumped out of mixing tank 18 by the pump 70 with the level in tank 18 being maintained approximately constant as described previously.

Although the mixing and proportioning unit of the present invention is especially adapted for use in apparatus for supplying dialysate to a plurality of artificial kidney units, it will be realized that the apparatus of the present invention is useful in other areas as well wherein thorough mixing and proportioning of one liquid relative to another liquid is desired.

I claim:
1. A device for mixing and proportioning fluids comprising:
 a. first and second tanks for containing first and second liquids respectively,
 b. first and second rotatably mounted bucket wheel assemblies associated with said first and second tanks respectively.
 c. the first and second bucket wheel assemblies each having thereon a plurality of buckets with the liquid capacity of each of the buckets of the first bucket wheel assembly being in predetermined relation to the liquid capacity of each of the buckets of the second bucket wheel assembly,
 d. said buckets being mounted on their respective bucket wheel assemblies and the bucket wheel assemblies being so associated with the first and second tanks that said buckets of the first bucket wheel assembly sequentially enter into and emerge from the liquid contained in the first tank while the buckets of the second bucket wheel assembly sequentially enter into and emerge from the liquid contained in the second tank during rotation of the two bucket wheel assemblies.
 e. fill means on each bucket arranged to permit complete filling of each bucket between the times the buckets sequentially enter into and emerge from the liquids contained in the first and second tanks,
 f. discharge means associated with each bucket to permit the contents of each of the latter to discharge after emergence of each bucket from the liquids contained in the first and second tanks,
 g. mixer means adapted to receive the proportioned, discharged liquids passing through said discharge means, said mixer means including means arranged to create turbulence therein to effect mixing of the liquids from said first and second tanks,
 h. and discharge means associated with said mixer means to permit outflow of the proportioned mixed liquid therefrom.

2. The device according to claim 1 wherein the buckets of the first bucket wheel assembly are mounted relative to the buckets of the second bucket wheel assembly as to permit discharge of each of the first mentioned buckets substantially simultaneously with discharge of each of the second mentioned buckets.

3. The device according to claim 1 further including a third tank adapted to contain a mixture of said first and second liquids, said mixer means being disposed relative to said third tank so that the latter may receive the mixed liquids from the discharge means of said mixer means, and outlet means in said third tank.

4. The device according to claim 1 wherein said bucket wheel assemblies are mounted for rotation about a common axis and wherein each bucket wheel assembly includes means supporting said buckets in spaced array about the rotation axis of the bucket wheels, said discharge means including fluid conductors connected to each bucket and extending therefrom generally radially inwardly towards said rotation axis such that the exit end portions of the fluid conductors are spaced about the rotation axis, said mixer means including means positioned beneath said exit end portions to receive discharge liquid therefrom.

5. The device according to claim 3 wherein the outlet means of said third tank is adapted to be connected to a user of the proportioned, mixed, liquids, and wherein the means for creating turbulence within the mixer include a conduit connected to return unused liquid from said user to said mixer to set up a liquid flow opposing the flow set up in said mixer by the liquids discharged from said buckets thereby creating turbulence to ensure proper mixing of the return liquid with the discharged liquids.

6. The device according to claim 5 wherein the discharge means associated with the mixer includes a plurality of apertures in a lower portion thereof to permit escape of the mixed liquids from the interior of the mixer.

7. The device according to claim 3 wherein said bucket wheel assemblies are mounted for rotation about a common axis and wherein each bucket wheel assembly includes means supporting said buckets in spaced array about the rotation axis of the bucket wheels, said discharge means including fluid conductors connected to each bucket and extending therefrom generally radially inwardly towards said rotation axis such that the exit end portions of the fluid conductors are spaced about the rotation axis, said mixer means including means positioned beneath said exit end portions to receive discharge liquid therefrom.

8. Apparatus for mixing and proportioning fluids comprising:
   a. first and second containers for holding first and second liquid bodies respectively;
   b. first and second assemblies supporting first and second sets of spaced buckets respectively and arranged to guide said first and second sets of buckets in first and second paths of travel respectively, said first and second assemblies arranged such that when the apparatus is in use, a portion of said first path of travel is adapted to pass through the first liquid body and a portion of the second path is adapted to pass through the second liquid body;
   c. means for driving the first and second sets of buckets in their respective paths of travel whereby they successively enter and emerge from their respectively associated liquid bodies;
   d. fill ports in each of said buckets to enable said buckets to fill with said liquids during passage of the buckets through said liquids;
   e. discharge means associated with each of said buckets arranged to permit escape of the contents of said buckets after emergence thereof from said first and second liquids,
   f. mixing means arranged to receive the liquids escaping from said buckets and adapted to mix the first and second liquids together,
   g. the liquid capacity of each bucket of the first set being in predetermined relation to the liquid capacity of each bucket of the second set whereby predetermined proportions of said liquids are mixed together in said mixing means.

9. Apparatus according to claim 8 wherein said first and second assemblies support the first and second sets of buckets for movement in circular paths lying in spaced vertical planes.

10. Apparatus according to claim 9 wherein the buckets are so arranged on said first and second assemblies that discharge of the contents of successive ones of the buckets of the first set occurs simultaneously with discharge of the contents of successive ones of the buckets of the second set.

11. Apparatus for mixing and proportioning liquids comprising: a plurality of tanks for containing liquids to be mixed together; each of the tanks having at least partially disposed therein an assembly carrying a plurality of buckets, said assemblies being adapted to rotate to cause said buckets to successively enter into and emerge from the liquids contained in their respectively associated tanks, means to effect rotation of said assemblies, means associated with each bucket to permit filling of each of said buckets during each rotation cycle of each of the assemblies, means associated with each bucket to effect discharge of the contents of the buckets at a discharge region, and mixing means adapted to receive the liquids discharged at the discharge region and adapted to mix the liquids together, the liquid capacities of the buckets of each assembly being preselected to permit a desired proportioning of the several liquids relative to one another.

12. Apparatus according to claim 11 wherein a mixing tank is provided with said mixing means constructed to discharge the mixed liquids into said mixing tank, there being two tanks for containing liquids to be mixed together disposed in flanking relation to the mixing tank.

13. Apparatus according to claim 11 wherein each said assembly comprises means supporting said plurality of buckets in a circular array for rotation in a vertical plane, each of the assemblies being mounted for rotation about a common axis, there being equal numbers of buckets on each assembly with said buckets mounted for substantially simultaneous discharge of their contents during rotation of said assemblies.

14. Apparatus according to claim 13 wherein the means to effect discharge of the buckets includes discharge conduits associated with respective ones of said buckets and extending from each of the latter inwardly towards said common axis to exit end portions spaced around the latter, such portions generally overlying said mixing means.

15. An apparatus according to claim 14 wherein said mixing means generally includes an elongated trough defining said discharge region underlying said rotation axis and disposed to receive liquid discharging from the exit end portions of said conduits, a chamber connected to said trough to receive liquids passing from said trough, and means for creating turbulence within said chamber to create proper mixing of said liquids.

16. Apparatus according to claim 15 wherein a mixing tank is provided to serve as a reservoir for the mixed, proportioned liquids and wherein said chamber has a plurality of apertures in a lower portion thereof to permit outflow of the mixed liquids into the mixing tank, said mixing tank having an outlet opening therein permitting the mixed, proportioned liquids to be supplied to a user.

17. Apparatus according to claim 16 including pump means connected to said outlet opening of the mixing tank adapted to supply the mixed liquids to said user, said pump having a capacity to supply the liquid at a rate greater than that demanded by said user, and a pipe connected to return excess liquid from said user to said mixing tank, said pipe being arranged to direct the return flow of excess liquid upwardly into said chamber of the mixing means thereby to provide said means for creating turbulence within said chamber.

18. Apparatus according to claim 13 including means for maintaining the upper surfaces of the liquids in said tanks at predetermined levels, said buckets being mounted on their associated assemblies in such manner as to permit the medial axis of each bucket to assume a true vertical position after the filling means of each bucket rises above the liquid surface during rotation of the assembly on which such bucket is mounted thereby permitting levelling of the contents of each bucket.

19. Apparatus according to claim 18 wherein each said assembly comprises means supporting said plurality of buckets in a circular array for rotation in a vertical plane, each of the assemblies being mounted for rotation about a common axis, there being equal numbers of buckets on each assembly with said buckets mounted for substantially simultaneous discharge of their contents during rotation of said assemblies.

20. Apparatus according to claim 19 wherein the means to effect discharge of the buckets includes discharge conduits associated with respective ones of said buckets and extending from each of the latter inwardly towards said common axis to exit end portions spaced around the latter, such portions generally overlying said mixing means.

21. Apparatus according to claim 20 wherein said mixing means generally includes an elongated trough defining said discharge region underlying said rotation axis and disposed to receive liquid discharging from the exit end portions of said conduits, a chamber connected to said trough to receive liquids passing from said trough, and means for creating turbulence within said chamber to create proper mixing of said liquids.

22. Apparatus according to claim 21 wherein a mixing tank is provided to serve as a reservoir for the mixed, proportioned liquids and wherein said chamber has a plurality of apertures in a lower portion thereof to permit outflow of the mixed liquids into the mixing tank, said mixing tank having an outlet opening therein permitting the mixed, proportioned liquids to be supplied to a user.

23. Apparatus according to claim 22 including pump means connected to said outlet opening of the mixing tank adapted to supply the mixed liquids to said user, said pump having a capacity to supply the liquid at a rate greater than that demanded by said user, and a pipe connected to return excess liquid from said user to said mixing tank, said pipe being arranged to direct the return flow of excess liquid upwardly into said chamber of the mixing means thereby to provide said means for creating turbulence within said chamber.